(12) United States Patent
Han et al.

(10) Patent No.: US 8,429,515 B2
(45) Date of Patent: Apr. 23, 2013

(54) APPARATUS AND METHOD FOR TRANSMITTING AND RECEIVING CONTROL INFORMATION IN MULTIPLE INPUT MULTIPLE OUTPUT SYSTEM

(75) Inventors: Jung-Su Han, Yongin-si (KR); Hi-Chan Moon, Yongin-si (KR); Jun-Sung Lim, Seoul (KR); Seong-Woo Ahn, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 201 days.

(21) Appl. No.: 13/096,299

(22) Filed: Apr. 28, 2011

(65) Prior Publication Data

US 2011/0271168 A1 Nov. 3, 2011

(30) Foreign Application Priority Data

Apr. 28, 2010 (KR) ........................ 10-2010-0039272

(51) Int. Cl.
*H03M 13/00* (2006.01)
*H04W 72/00* (2009.01)
*H04W 4/00* (2009.01)
*H04B 7/00* (2006.01)
*H04L 27/00* (2006.01)

(52) U.S. Cl.
USPC ........... 714/807; 714/821; 375/295; 375/299; 370/327; 370/329; 455/450; 455/452.1; 455/464; 455/509; 455/515

(58) Field of Classification Search .................. 714/807, 714/821; 375/295, 299; 370/327, 329; 455/450, 455/452.1, 464, 509, 515
See application file for complete search history.

(56) References Cited

U.S. PATENT DOCUMENTS

| | | | | |
|---|---|---|---|---|
| 8,270,359 | B2 * | 9/2012 | Nangia et al. | 370/329 |
| 2011/0194504 | A1 * | 8/2011 | Gorokhov et al. | 370/329 |
| 2011/0269492 | A1 * | 11/2011 | Wang | 455/509 |
| 2012/0034945 | A1 * | 2/2012 | Wang | 455/515 |
| 2012/0114021 | A1 * | 5/2012 | Chung et al. | 375/211 |
| 2012/0134338 | A1 * | 5/2012 | Ko et al. | 370/330 |
| 2012/0182950 | A1 * | 7/2012 | Chung et al. | 370/329 |
| 2012/0269295 | A9 * | 10/2012 | Ko et al. | 375/299 |
| 2012/0309402 | A1 * | 12/2012 | Cheng et al. | 455/450 |
| 2012/0314667 | A1 * | 12/2012 | Taoka et al. | 370/329 |
| 2012/0320862 | A1 * | 12/2012 | Ko et al. | 370/329 |

FOREIGN PATENT DOCUMENTS

KR    EP 2 296 293 A2 *    3/2011

* cited by examiner

*Primary Examiner* — John J Tabone, Jr.
(74) *Attorney, Agent, or Firm* — Jefferson IP Law, LLP

(57) ABSTRACT

An apparatus and a method for transmitting and receiving control information in a Multiple Input Multiple Output (MIMO) system are provided. A method of a base station for transmitting control information to a terminal in the MIMO system includes transmitting first control information for every transmission mode except for a Multiple-User (MU)-MIMO mode, to the terminal over a control channel of a subframe, and transmitting second control information for the MU-MIMO mode to the terminal over a data channel of the subframe.

24 Claims, 11 Drawing Sheets

APPARATUS AND METHOD FOR TRANSMITTING AND RECEIVING CONTROL INFORMATION IN MULTIPLE INPUT MULTIPLE OUTPUT SYSTEM

PRIORITY

This application claims the benefit under 35 U.S.C. §119 (a) of a Korean patent application filed in the Korean Intellectual Property Office on Apr. 28, 2010, and assigned Serial No. 10-2010-0039272, the entire disclosure of which is hereby incorporated by reference.

BACKGROUND OF THE INVENTION

1. Field of the Invention

The present invention relates to an apparatus and a method for transmitting and receiving control information in a Multiple Input Multiple Output (MIMO) system. More particularly, the present invention relates to an apparatus and a method for transmitting and receiving Single User (SU)-MIMO control information and Multiple User (MU)-MIMO control information in the MIMO system.

2. Description of the Related Art

In response to increasing demand for high-speed and high-quality data transmission, Multiple Input Multiple Output (MIMO) technology using a plurality of transmit antennas and receive antennas is drawing much attention. The MIMO technology carries out communication over a plurality of channels with the plurality of the antennas and thus greatly enhances a channel capacity, compared to a single antenna. For example, when both of a transmitter and a receiver include M-ary transmit antennas and receive antennas, channels between the antennas are independent of each other, and a bandwidth and a whole transmit power are fixed, an average channel capacity increases M times, compared to the single antenna.

The MIMO technology may be divided into Single User (SU)-MIMO and Multiple User (MU)-MIMO. The SU-MIMO allows a pair of the transmitter and the receiver to perform one-to-one communication by occupying all of the channels with the multiple antennas, and the MU-MIMO performs communication between the transmitter and the receiver in one-to-many relation by splitting the channels with the multiple channels.

Meanwhile, a Long Term Evolution (LTE)-advanced system which is an International Mobile Telecommunication (IMT)-advanced candidate, utilizes multi-user scheduling gain in a space domain at maximum, and is considering a technique for extending 44 downlink SU-MIMO of the existing LTE Rel-8 to 88 downlink SU-MIMO, and a downlink MU-MIMO technique as its core techniques to attain higher maximum spectral efficiency and average cell throughput than the downlink MIMO. While the LTE Rcl-8 system also adopts the MU-MIMO, it applies the most simplified MU-MIMO based on conventional Spatial Division Multiple Access (SDMA). Thus, a base station provides a terminal with no information relating to the same channel interference from other users scheduled together with the corresponding terminal. The only difference between the MU-MIMO and the SU-MIMO according to the LTE Rel-8 standard is whether information relating to the transmit power sharing is contained in a corresponding Physical Downlink Control CHannel (PDCCH).

To properly use the spatial diversity gain of the MU-MIMO, the same channel interference between the transmitter and the receiver should be adequately handled, so as to reduce performance degradation caused by the same channel interference. For doing so, the LTE-advanced system is considering not only control information for the SU-MIMO but also additional control information for the MU-MIMO, such as the number of co-scheduled User Equipments (UEs), actual transmission rank and port of all the co-scheduled UEs, exact resource allocation of all the co-scheduled UEs, and Modulation and Coding Scheme (MCS) level. Accordingly, details of the control information transmission for the MU-MIMO are of great concern to the current LTE-advanced MIMO.

The control information transmission for the MU-MIMO currently under consideration includes largely two methods.

The first method supports the SU-MIMO and the MU-MIMO in different transmission modes. When additional control information for distinguishing the SU-MIMO mode and the MU-MIMO mode is transmitted, overhead of the additional transmission over a control channel increases in terms of the base station. When the first method considers higher layer signaling to distinguish the SU-MIMO mode and the MU-MIMO mode, the transmission mode is semi-statically configured to thus deteriorate scheduling flexibility.

The second method supports the SU-MIMO and the MU-MIMO in the same transmission mode with different Downlink Control Information (DCI) formats. Since the terminal has to monitor the two DCI formats of the different lengths in the control channel at the same time, complexity in the decoding increases.

As discussed above, the current MIMO control information transmission methods are inefficient in view of the MIMO support. Thus, what is needed is a more rational control information transmission method for supporting the SU-MIMO and the MU-MIMO to attain a maximum gain through the efficient MIMO support.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for transmitting and receiving control information in a Multiple Input Multiple Output (MIMO) system.

Another aspect of the present invention is to provide an apparatus and a method for transmitting and receiving Singe User (SU)-MIMO control information and Multiple User (MU)-MIMO control information in a MIMO system.

Yet another aspect of the present invention is to provide an apparatus and a method for transmitting and receiving control information for a MU-MIMO mode over a data channel (e.g., a Physical Downlink Shared CHannel (PDSCH)), rather than a control channel (e.g., Physical Downlink Control CHannel (PDCCH)) in a subframe, in a MIMO system.

Still another aspect of the present invention is to provide an apparatus and a method for transmitting and receiving information indicating whether control information for a MU-MIMO mode is contained in a predefined region of a data channel (e.g., a PDSCH), over a control channel (e.g., a PDCCH) of a subframe in a MIMO system.

A further aspect of the present invention is to provide an apparatus and a method for indicating presence or absence of control information for a MU-MIMO mode by inserting a 1-bit indicator into a control channel (e.g., PDCCH) of a subframe in a MIMO system.

A still further aspect of the present invention is to provide an apparatus and a method for indicating presence or absence of control information for a MU-MIMO mode by masking a predefined mask code in a Cyclic Redundancy Check (CRC) of the control information carried over a control channel (e.g., a PDCCH) of a subframe in a MIMO system.

A yet further aspect of the present invention is to provide an apparatus and a method for transmitting and receiving control information to support dynamic switching between a SU-MIMO mode and a MU-MIMO mode and to minimize additional control information transmission of a base station or additional control information decoding of a terminal in a MIMO system.

According to an aspect of the present invention, a method of a base station for transmitting control information to a terminal in a MIMO system is provided. The method includes transmitting first control information for every transmission mode except for a MU-MIMO mode, to the terminal over a control channel of a subframe, and transmitting second control information for the MU-MIMO mode to the terminal over a data channel of the subframe.

According to another aspect of the present invention, a method of a terminal for receiving control information from a base station in a MIMO system is provided. The method includes receiving first control information for every transmission mode except for a MU-MIMO mode, from the base station over a control channel of a subframe, and receiving second control information for the MU-MIMO mode from the base station over a data channel of the subframe.

According to yet another aspect of the present invention, an apparatus of a base station for transmitting control information to a terminal in a MIMO system is provided. The apparatus includes a first control information generator for generating first control information for every transmission mode except for a MU-MIMO mode, a second control information generator for generating second control information for the MU-MIMO mode, and a transmit signal processor for transmitting the generated first control information to the terminal over a control channel of a subframe, and for transmitting the generated second control information to the terminal over a data channel of the subframe.

According to still another aspect of the present invention, an apparatus of a terminal for receiving control information from a base station in a MIMO system is provided. The apparatus includes a receive signal processor for receiving first control information for every transmission mode except for a MU-MIMO mode, from the base station over a control channel of a subframe, and for receiving second control information for the MU-MIMO mode from the base station over a data channel of the subframe, a first control information checker for checking the first control information for every transmission mode except for the MU-MIMO mode, and a second control information checker for checking the second control information for the MU-MIMO mode.

Other aspects, advantages, and salient features of the invention will become apparent to those skilled in the art from the following detailed description, which, taken in conjunction with the annexed drawings, discloses exemplary embodiments of the invention.

Before proceeding to the DETAILED DESCRIPTION OF EXEMPLARY EMBODIMENTS section below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a technique for transmitting and receiving not only Single User (SU)-Multiple Input Multiple Output (MIMO) control information but also Multiple User (MU)-MIMO control information in a MIMO system.

Figure 1:
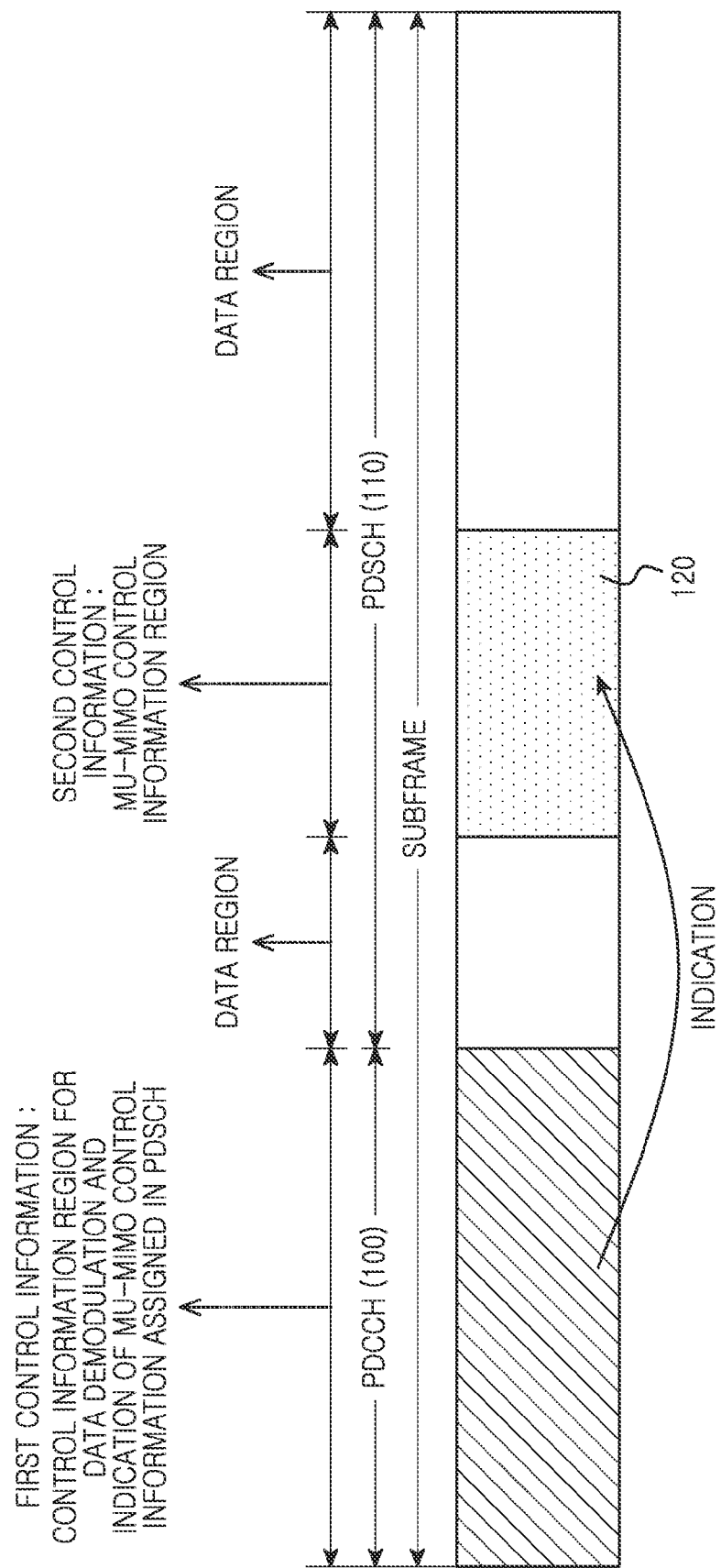
FIG. 1 illustrates a subframe structure for carrying Single User (SU)-Multiple Input Multiple Output (MIMO) control information and Multiple User (MU)-MIMO control information in a MIMO system according to an exemplary embodiment of the present invention.

FIG. 1 illustrates a subframe structure for carrying SU-MIMO control information and MU-MIMO control information in a MIMO system according to an exemplary embodiment of the present invention.

Referring to FIG. 1, a downlink frame sent from a base station to a terminal in the MIMO system includes a plurality of subframes. Each subframe includes a Physical Downlink Control CHannel (PDCCH) 100 and a Physical Downlink Shared CHannel (PDSCH) 110.

The PDCCH 100, which is a front channel in a time axis of each subframe, carries first control information which is used to demodulate data transmitted over the PDSCH 110. The first control information includes control information (e.g., resource allocation information) for every mode except for a MU-MIMO mode, for example, for a single antenna mode, a SU-MIMO mode, and a transmit diversity mode. Herein, such modes are classified as transmission modes configured by higher layer signaling. The first control information includes information indicating whether a predefined region 120 of the PDSCH 110 includes second control information. Herein, a method for including the information of the presence or the absence of the second control information to the first control information shall be explained in more detail further below with reference to FIG. 2 or FIG. 3.

The PDSCH 110, which is a rear channel in the time axis of each subframe, carries normal data. The predefined region 120 of the PDSCH 110 transmits the second control information, rather than data, as control information for the MU-MIMO mode. Herein, the second control information includes the number of co-scheduled UEs, actual transmission rank and port of all the co-scheduled UEs, exact resource allocation information of all the co-scheduled UEs, and Modulation and Coding Scheme (MCS) level.

Herein, the control information of the terminal contained in the second control information is spatially multiplexed and allocated to the same resource. Compared to a conventional method for allocating control information of terminals scheduled in the MU-MIMO mode to different resources and transmitting the control information over the PDCCH 100, an exemplary embodiment of the present invention may reduce the resource allocation for transmitting the second control information (by up to 1/the number of the terminals scheduled in the MU-MIMO mode) and thus achieve efficient resource utilization.

Based on the scheduling, the base station determines whether the current transmission mode is the MU-MIMO mode. Determining that the current transmission mode is the MU-MIMO mode, the base station transmits to the terminal the first control information including the presence indication information of the second control information over the PDCCH 100 and transmits to the terminal the second control information over the predefined region 120 of the PDSCH 110 so that the terminal may receive not only the first control information but also the second control information. When the current transmission mode is a transmission mode other than the MU-MIMO mode, the base station transmits to the terminal the first control information including the absence indication information of the second control information over the PDCCH 100 and does not transmit to the terminal the second control information over the predefined region 120 of the PDSCH 110 so that the terminal receives only the first control information.

The terminal receives the first control information from the base station over the PDCCH 100 and examines whether the first control information received includes the presence indication information of the second control information. When the first control information received includes the presence indication information of the second control information, the terminal determines that the current transmission mode is the MU-MIMO mode, receives the second control information over the predefined region 120 of the PDSCH 110, and demodulates data using the first control information and the second control information. When the received first control information includes the absence indication information of the second control information, the terminal determines that the current transmission mode is a transmission mode other than the MU-MIMO mode, does not receive the second control information over the predefined region 120 of the PDSCH 110, and demodulates data using only the first control information.

As such, as the base station indicates the presence or the absence of the second control information through the first control information sent over the PDCCH 100 and transmits the second control information over the predefined region 120 of the PDSCH 110, the terminal may immediately perform dynamic switching in the current transmission mode without a separate direction from the base station for the current transmission mode.

Figure 2:
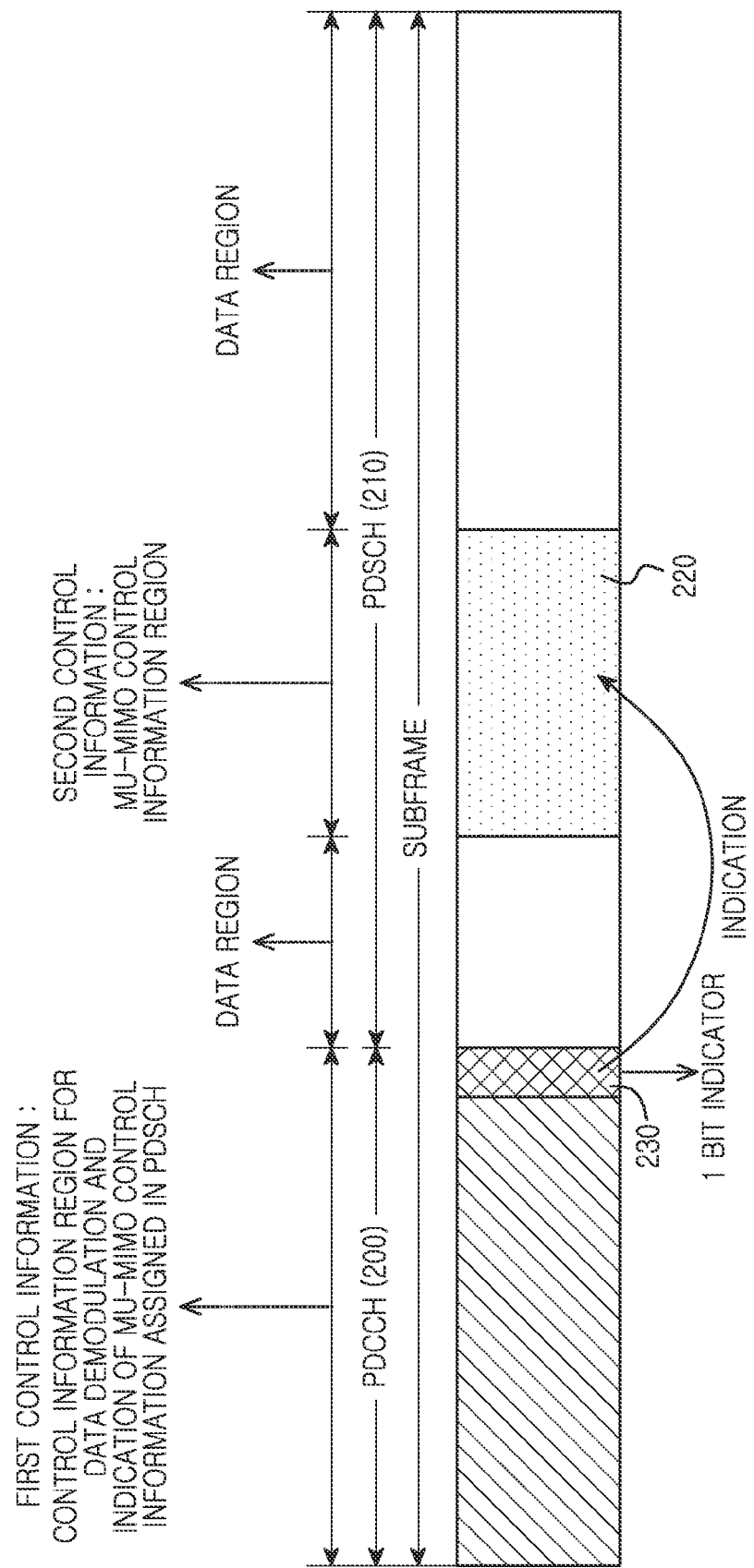
FIG. 2 illustrates a method for indicating presence or absence of second control information by inserting a 1-bit indicator into first control information in a MIMO system according to an exemplary embodiment of the present invention.

FIG. 2 illustrates a method for indicating presence or absence of second control information by inserting a 1-bit indicator into first control information in a MIMO system according to an exemplary embodiment of the present invention.

Referring to FIG. 2, the base station indicates the presence or the absence of the second control information in the predefined region 220 of the PDSCH 210 by inserting a 1-bit indicator 230 to the first control information transmitted over the PDCCH 200. The terminal determines based on the 1-bit indicator 230 inserted into the first control information, whether the second control information is contained. For example, when the indicator bit is '1', the terminal determines the presence of the second control information in the predefined region 220 of the PDSCH 210. When the indicator bit is '0', the terminal determines the absence of the second control information in the predefined region 220 of the PDSCH 210. Since the SU-MIMO mode and the MU-MIMO mode have a Downlink Control Information (DCI) format of the same length in the PDCCH, the number of the decoding times of the terminal does not increase.

Figure 3:
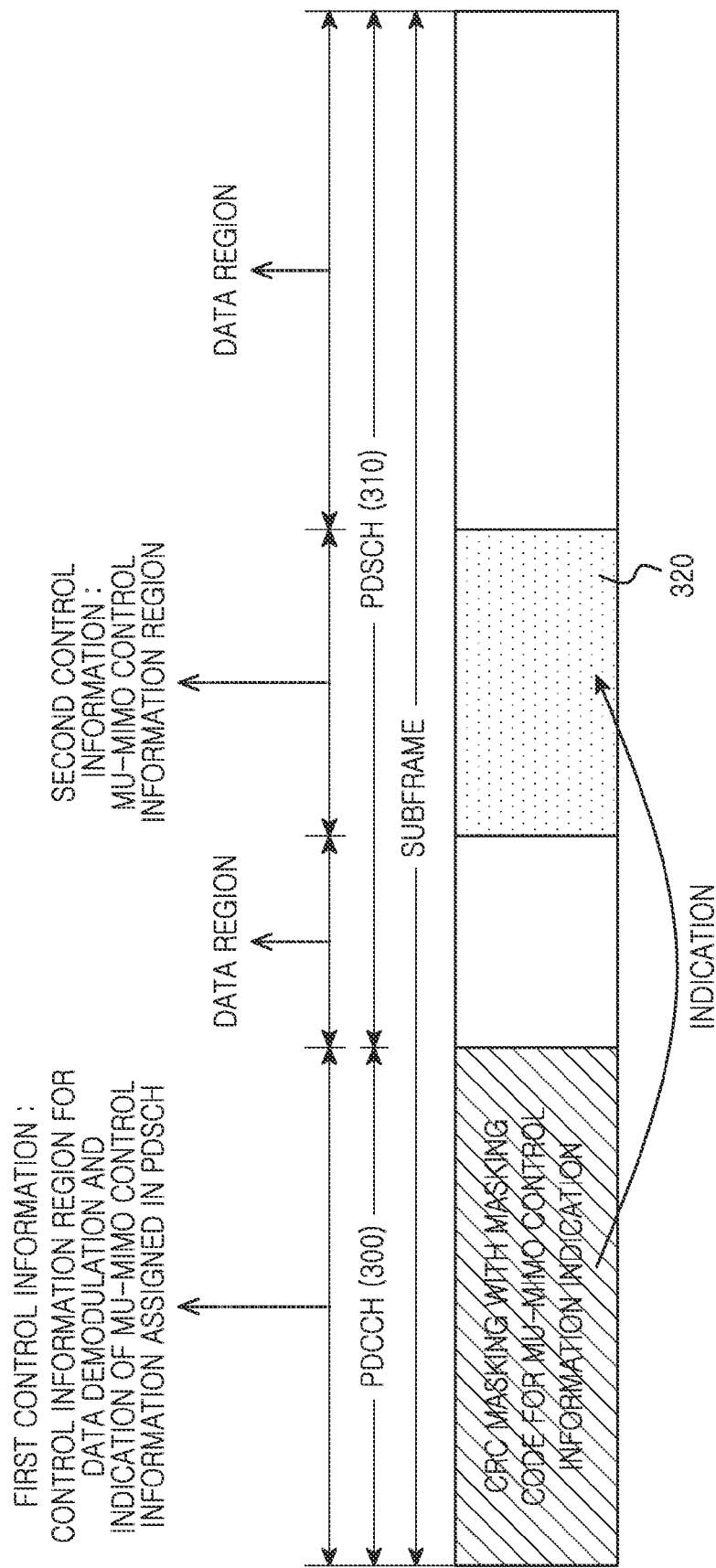
FIG. 3 illustrates a method for indicating presence or absence of second control information by masking a predefined mask code in Cyclic Redundancy Check (CRC) of first control information in a MIMO system according to an exemplary embodiment of the present invention.

FIG. 3 illustrates a method for indicating presence or absence of second control information by masking a predefined mask code in Cyclic Redundancy Check (CRC) of first control information in a MIMO system according to an exemplary embodiment of the present invention.

Referring to FIG. 3, the base station indicates the presence of the second control information in the predefined region 320 of the PDSCH 310 by masking a predefined mask mode in the CRC of the first control information sent over the PDCCH 300. Herein, the mask code has the same length as the CRC. The terminal determines the presence or the absence of the second control information by CRC-checking in a case when the predefined mask code is masked in the CRC of the first control information and in a case when the predefined mask code is not masked in the CRC of the first control information. For instance, when the CRC check is successful in the case where the predefined mask mode is not masked in the CRC of the first control information, the terminal determines the absence of the second control information in the predefined region 320 of the PDSCH 310. When the CRC check is successful in the case where the predefined mask mode is masked in the CRC of the first control information, the terminal determines the presence of the second control information in the predefined region 320 of the PDSCH 310. Since the SU-MIMO mode and the MU-MIMO mode have the DCI format of the same length in the PDCCH, the number of the decoding times at the terminal does not increase. Also, there occurs no transmit power decrease or no resource efficiency reduction when a padding bit which is a redundant bit is inserted into the PDCCH.

Figure 4:
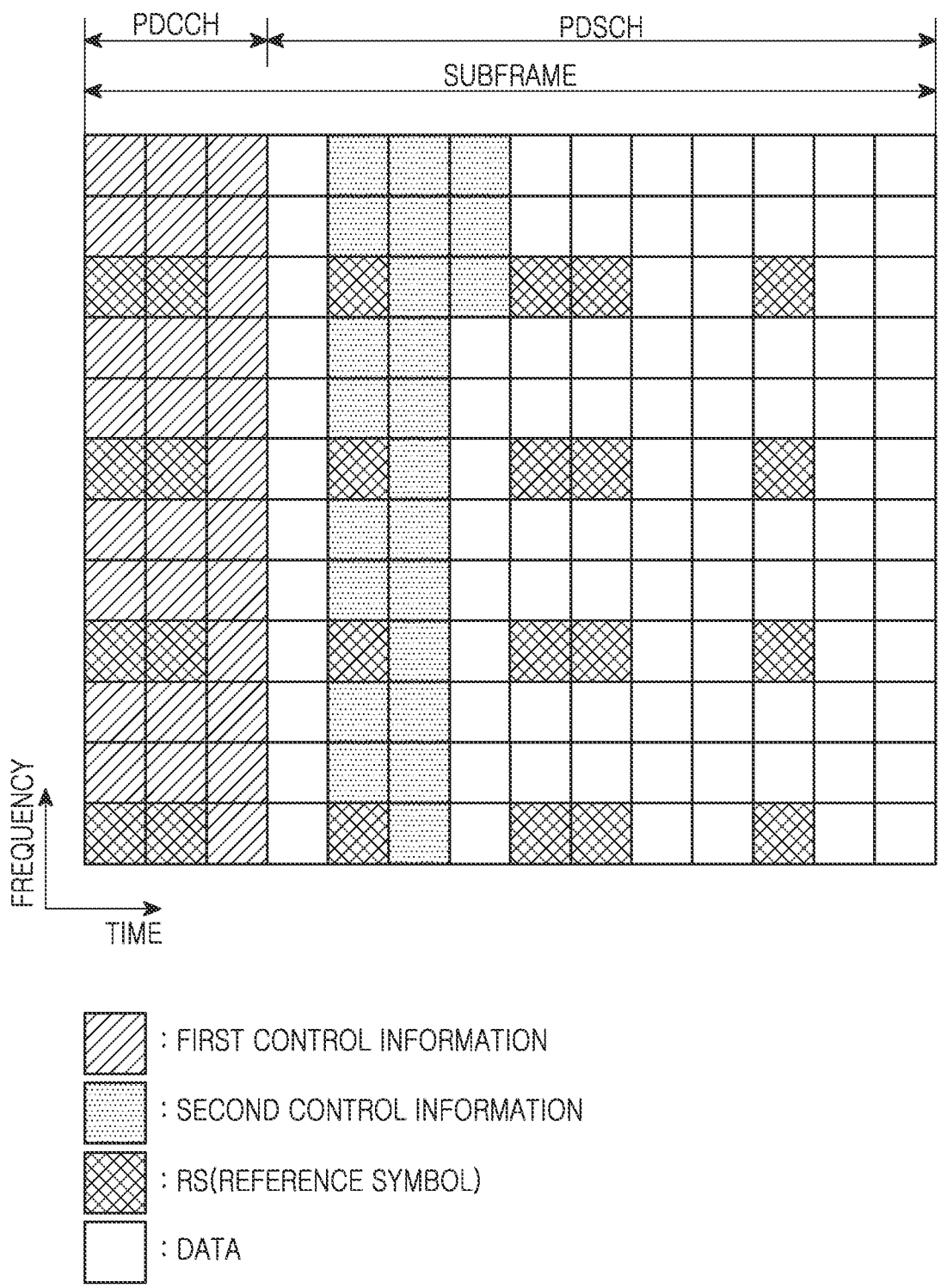
FIG. 4 illustrates a resource allocation method for transmitting and receiving first control information and second control information in a MIMO system according to an exemplary embodiment of the present invention.

FIG. 4 illustrates a resource allocation method for transmitting and receiving first control information and second control information in a MIMO system according to an exemplary embodiment of the present invention.

Referring to FIG. 4, the second control information is allocated to resources of the predefined fixed location and fixed size in the PDSCH, and allocated first into the frequency domain to minimize the performance degradation due to the processing time and the time diversity. The MCS level of the second control information may be the same as or different from the MCS level of data. To obtain the robust second control information, it is required to apply a low-order modulation such as Binary Phase Shift Keying (BPSK) and Quadrature Phase Shift Keying (QPSK), and a low coding rate, regardless of the MCS level of the data.

Figure 5:
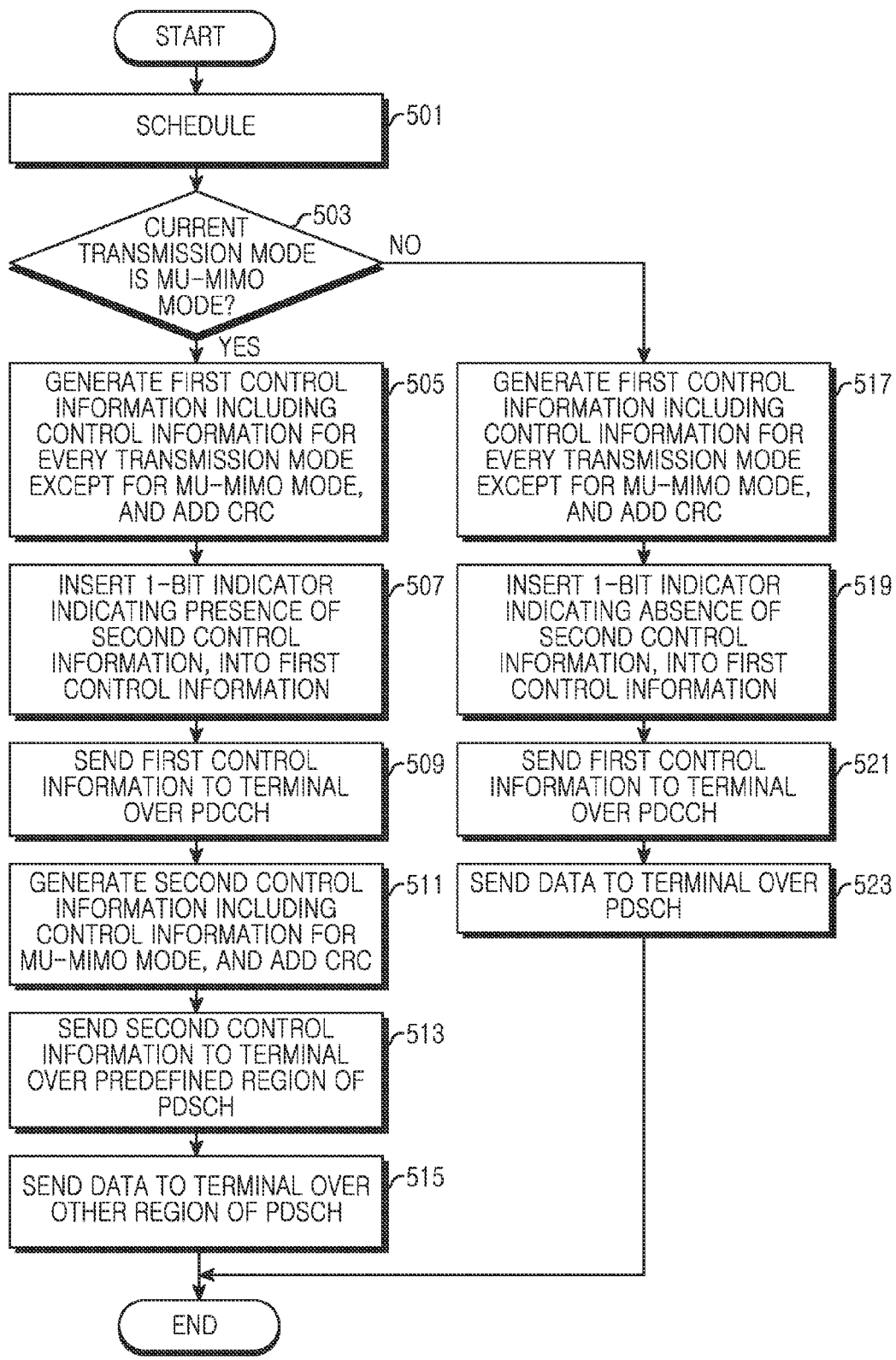
FIG. 5 is a flowchart of a method of a base station for transmitting control information to a terminal in a MIMO system according to an exemplary embodiment of the present invention.

FIG. 5 is a flowchart of a method of a base station for transmitting control information to a terminal in a MIMO system according to an exemplary embodiment of the present invention.

Referring to FIG. 5, in step 501, the base station schedules data to transmit over the PDSCH of the subframe.

Based on the scheduling, the base station determines whether the current transmission mode is the MU-MIMO mode in step 503.

When the current transmission mode is the MU-MIMO mode in step 503, the base station generates the first control information including the control information for every transmission mode (e.g., the SU-MIMO mode) excluding the MU-MIMO mode, based on the scheduling and appends the CRC to the generated first control information in step 505. Next, the base station proceeds to step 507.

In step 507, the base station inserts the 1-bit indicator indicating the presence of the second control information, into the first control information including the CRC appended, and encodes the first control information including the 1-bit indicator.

In step 509, the base station transmits the encoded first control information to the terminal over the PDCCH.

In step 511, based on the scheduling, the base station generates the second control information including the control information for the MU-MIMO mode, appends the CRC to the generated second control information, and then encodes the second control information including the CRC.

In step 513, the base station transmits the encoded second control information to the terminal over the predefined region of the PDSCH.

The base station transmits data to the terminal over a region of the PDSCH other than the predefined region of the PDSCH based on the scheduling in step 515, and then finishes this process.

In contrast, when the current transmission mode is a transmission mode other than the MU-MIMO mode in step 503, the base station generates the first control information including the control information for transmission modes other than the MU-MIMO mode, based on the scheduling and appends the CRC to the generated first control information in step 517. Next, the base station proceeds to step 519.

In step 519, the base station inserts the 1-bit indicator indicating the absence of the second control information into the first control information including the CRC, and encodes the first control information including the 1-bit indicator.

In step 521, the base station transmits the encoded first control information to the terminal over the PDCCH.

The base station transmits data to the terminal over the PDSCH based on the scheduling in step 523, and then finishes this process.

Figure 6:
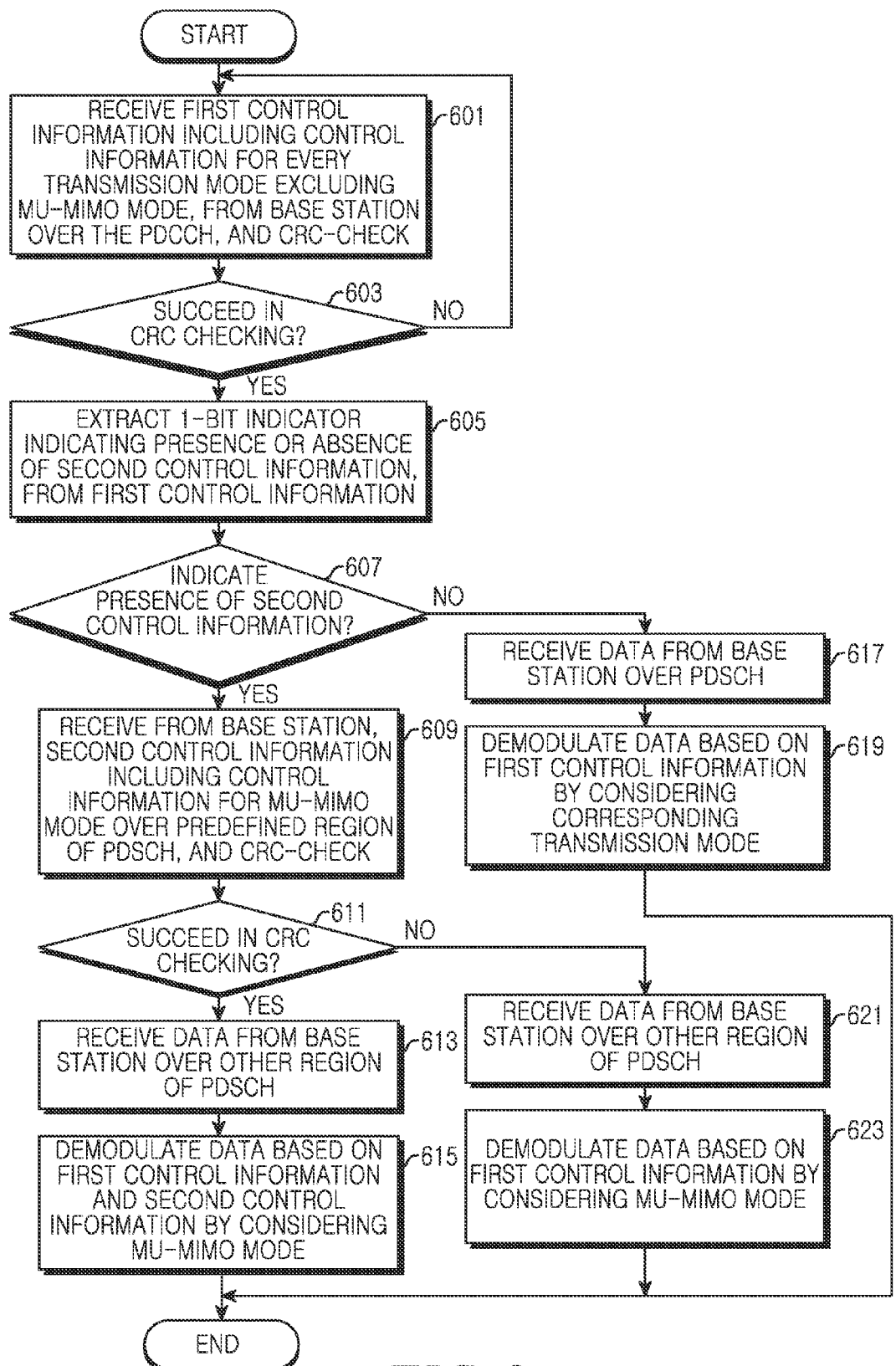
FIG. 6 is a flowchart of a method of a terminal for receiving control information from a base station in a MIMO system according to an exemplary embodiment of the present invention.

FIG. 6 is a flowchart of a method of a terminal for receiving control information from a base station in a MIMO system according to an exemplary embodiment of the present invention.

Referring to FIG. 6, in step 601, the terminal receives from the base station and decodes the first control information including the control information for every transmission mode (e.g., the SU-MIMO mode) excluding the MU-MIMO mode, over the PDCCH, and CRC-checks the decoded first control information.

In step 603, the terminal determines whether the CRC check on the first control information is successful.

When the CRC check on the first control information is not successful in step 603, the terminal returns to step 601.

In contrast, when the CRC check on the first control information is successful in step 603, the terminal extracts the 1-bit indicator indicating the presence or the absence of the second control information, from the first control information in step 605.

In step 607, the terminal determines whether the extracted 1-bit indicator indicates the presence or the absence of the second control information.

When the extracted 1-bit indicator indicates the presence of the second control information in step 607, the terminal recognizes that the current transmission mode is the MU-MIMO mode and proceeds to step 609. In step 609, the terminal receives from the base station and decodes the second control information including the control information for the MU-MIMO mode over the predefined region of the PDSCH, CRC-checks the decoded second control information in step 609, and then proceeds to step 611.

In step 611, the terminal determines whether the CRC check on the second control information is successful.

When the CRC check on the second control information is successful in step 611, the terminal receives the data from the base station over the region of the PDSCH other than the predefined region of the PDSCH in step 613, demodulates the received data based on the first control information and the second control information by considering the MU-MIMO mode in step 615, and then finishes this process.

When the CRC check on the second control information is not successful in step 611, the terminal receives the data from the base station over the region of the PDSCH other than the predefined region of the PDSCH in step 621, demodulates the received data based on the first control information by considering the MU-MIMO mode in step 623, and then finishes this process.

When the extracted 1-bit indicator indicates the absence of the second control information in step 607, the terminal recognizes that the current transmission mode is not the MU-MIMO mode and proceeds to step 617. In step 617, the terminal receives the data from the base station via the PDSCH, demodulates the received data based on the first control information by considering the corresponding transmission mode in step 619, and then finishes this process.

Figure 7:
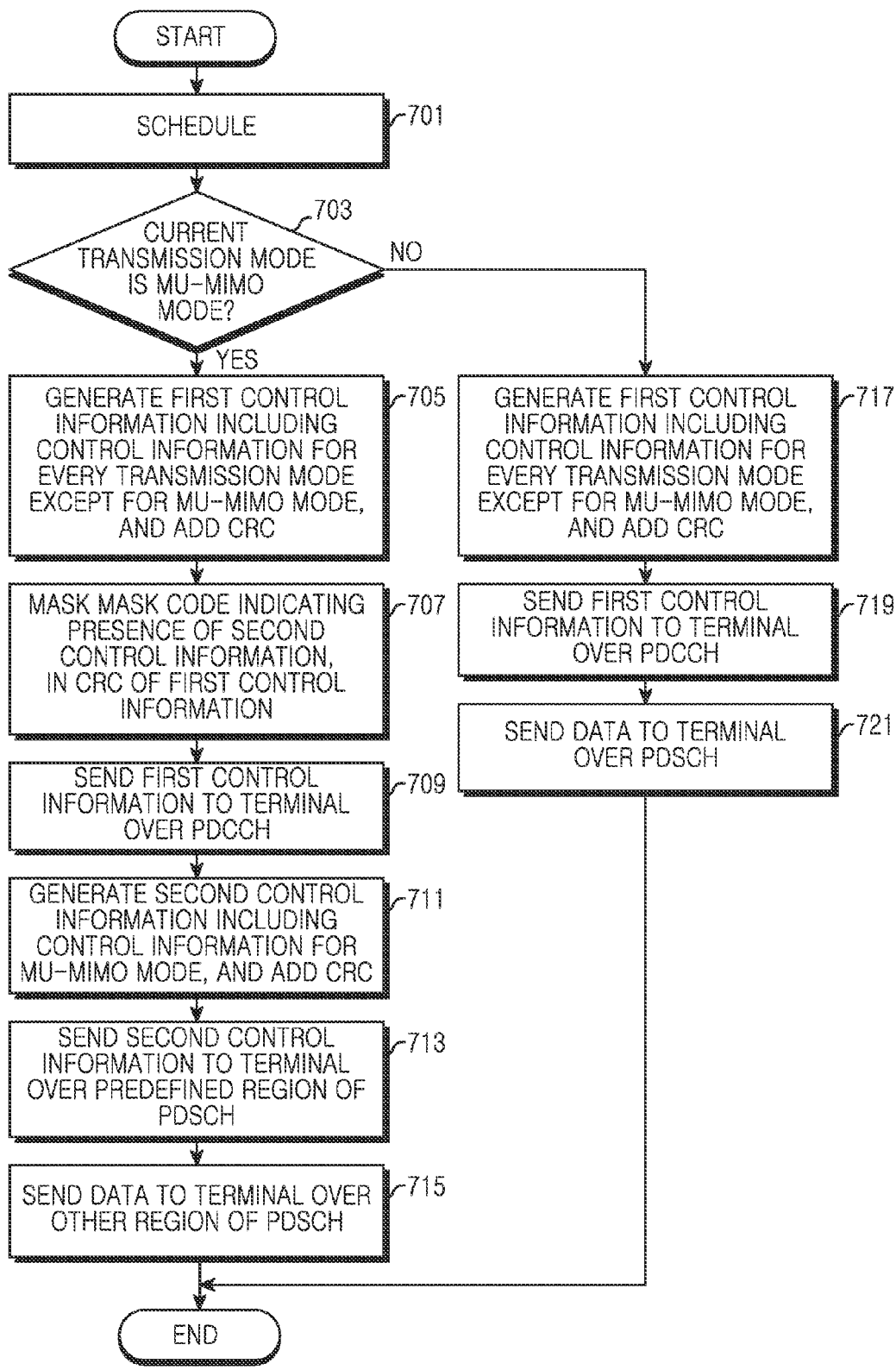
FIG. 7 is a flowchart of a method of a base station for transmitting control information to a terminal in a MIMO system according to another exemplary embodiment of the present invention.

FIG. 7 is a flowchart of a method of a base station for transmitting control information to a terminal in a MIMO system according to another exemplary embodiment of the present invention.

Referring to FIG. 7, in step 701, the base station schedules data to transmit over the PDSCH of the subframe.

Based on the scheduling, the base station determines whether the current transmission mode is the MU-MIMO mode in step 703.

When the current transmission mode is the MU-MIMO mode in step 703, the base station generates the first control information including the control information for every transmission mode (e.g., the SU-MIMO mode) excluding the MU-MIMO mode, based on the scheduling and appends the CRC to the generated first control information in step 705. Next, the base station proceeds to step 707.

In step 707, the base station masks the mask mode indicating the presence of the second control information, in the CRC of the first control information, and encodes the first control information with the CRC masked.

In step 709, the base station transmits the encoded first control information to the terminal over the PDCCH.

In step 711, based on the scheduling, the base station generates the second control information including the control information for the MU-MIMO mode, appends the CRC to the generated second control information, and then encodes the second control information including the CRC.

In step 713, the base station transmits the encoded second control information to the terminal over the predefined region of the PDSCH.

The base station transmits data to the terminal via the region of the PDSCH other than the predefined region of the PDSCH based on the scheduling in step 715, and then finishes this process.

In contrast, when the current transmission mode is the transmission mode other than the MU-MIMO mode in step 703, the base station generates the first control information including the control information for every transmission mode excluding the MU-MIMO mode, based on the scheduling, appends the CRC to the generated first control information, and encodes the first control information including the CRC in step 717. Next, the base station proceeds to step 719.

In step 719, the base station transmits the encoded first control information to the terminal over the PDCCH.

The base station transmits data to the terminal over the PDSCH based on the scheduling in step 721, and then finishes this process.

Figure 8A:
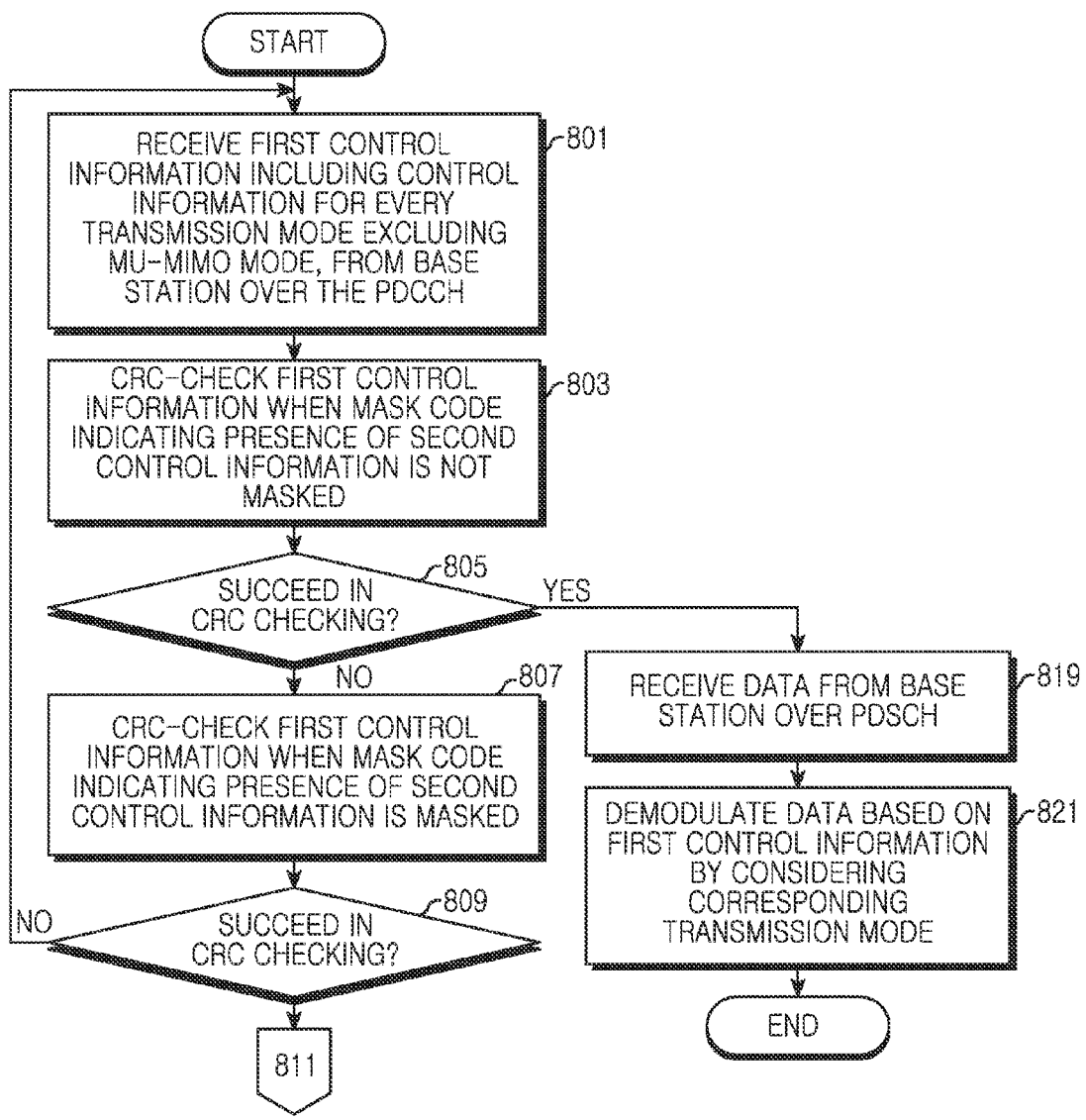
FIGS. 8A and 8B are flowcharts of a method of a terminal for receiving the control information from a base station in a MIMO system according to another exemplary embodiment of the present invention.
Figure 8B:
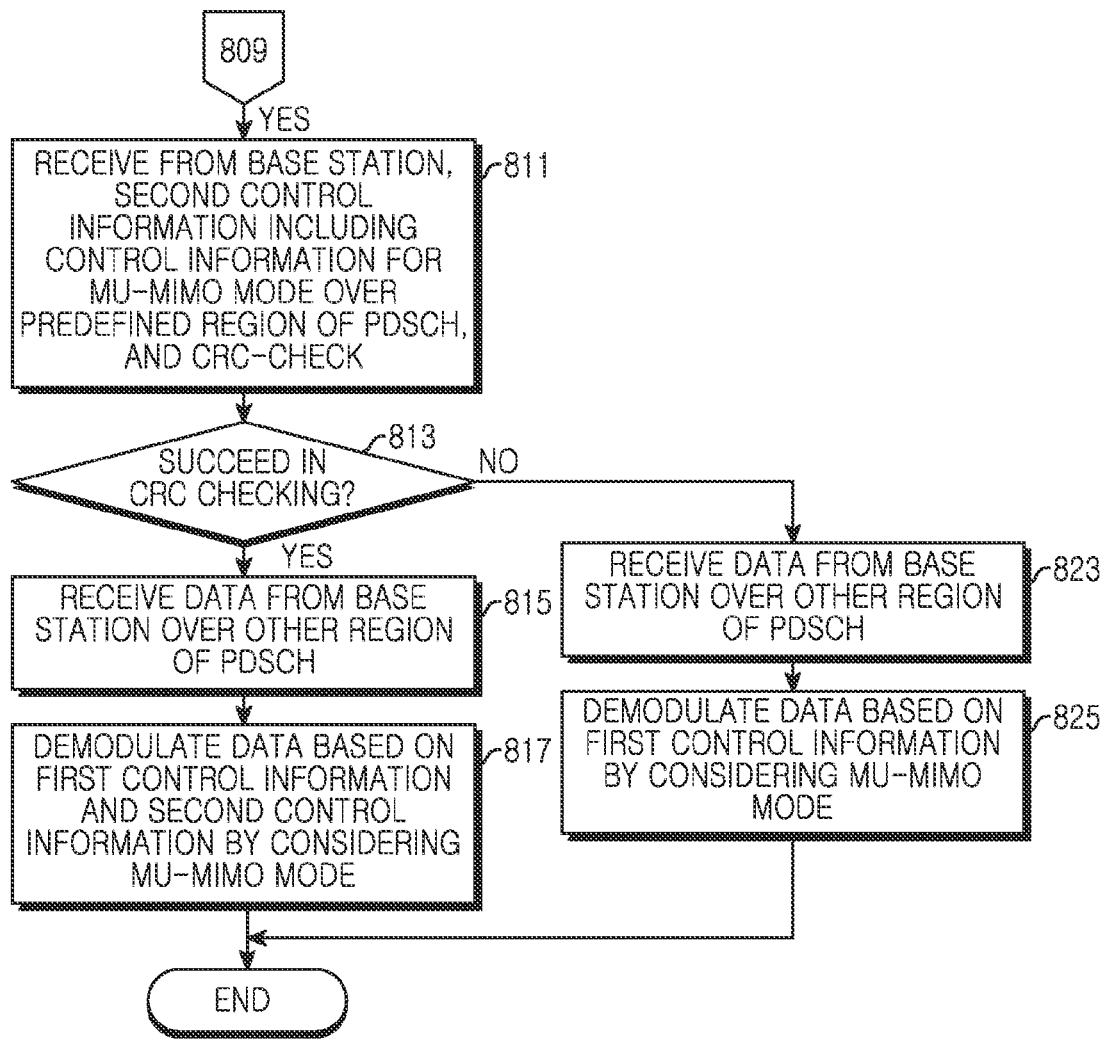

FIGS. 8A and 8B are flowcharts of a method of a terminal for receiving control information from a base station in a MIMO system according to another exemplary embodiment of the present invention.

Referring to FIG. 8A, in step 801, the terminal receives and decodes the first control information including the control information for every transmission mode (e.g., the SU-MIMO mode) excluding the MU-MIMO mode, from the base station over the PDCCH.

In step 803, the terminal CRC-checks the decoded first control information in a case where the mask code indicating the presence of the second control information is not masked.

In step 805, the terminal determines whether the CRC check of the decoded first control information in the case where the mask code indicating the presence of the second control information is not masked is successful.

When the CRC check of the decoded first control information in the case where the mask code indicating the presence of the second control information is not masked is successful in step 805, the terminal recognizes that the current transmission mode is not the MU-MIMO mode and proceeds to step 819. In step 819, the terminal receives the data from the base station via the PDSCH, demodulates the received data based on the first control information by considering the corresponding transmission mode in step 821, and then finishes this process.

When the CRC check of the decoded first control information in the case where the mask code indicating the presence of the second control information is not masked is not successful in step 805, the terminal CRC-checks the decoded first control information in case where the mask code indicating the presence of the second control information is masked in step 807, and then proceeds to step 809.

In step 809, the terminal determines whether the CRC check of the decoded first control information in the case where the mask code indicating the presence of the second control information is masked is successful.

When the CRC check of the decoded first control information in the case where the mask code indicating the presence of the second control information is masked is not successful in step 809, the terminal returns to step 801.

When the CRC check of the decoded first control information in the case where the mask code indicating the presence of the second control information is masked is successful in step 809, the terminal recognizes that the current transmission mode is the MU-MIMO mode and proceeds to step 811 in FIG. 8B.

Referring to FIG. 8B, in step 811, the terminal receives from the base station and decodes the second control information including the control information for the MU-MIMO mode over the predefined region of the PDSCH and CRC-checks the decoded second control information.

In step 813, the terminal determines whether the CRC check on the second control information is successful.

When the CRC check on the second control information is successful in step 813, the terminal receives the data from the base station over the region of the PDSCH other than the predefined region of the PDSCH in step 815, demodulates the received data based on the first control information and the second control information by considering the MU-MIMO mode in step 817, and then finishes this process.

When the CRC check on the second control information is not successful in step 813, the terminal receives the data from the base station over the region of the PDSCH other than the predefined region of the PDSCH in step 823, demodulates the received data based on the first control information by considering the MU-MIMO mode in step 825, and then finishes this process.

Figure 9:
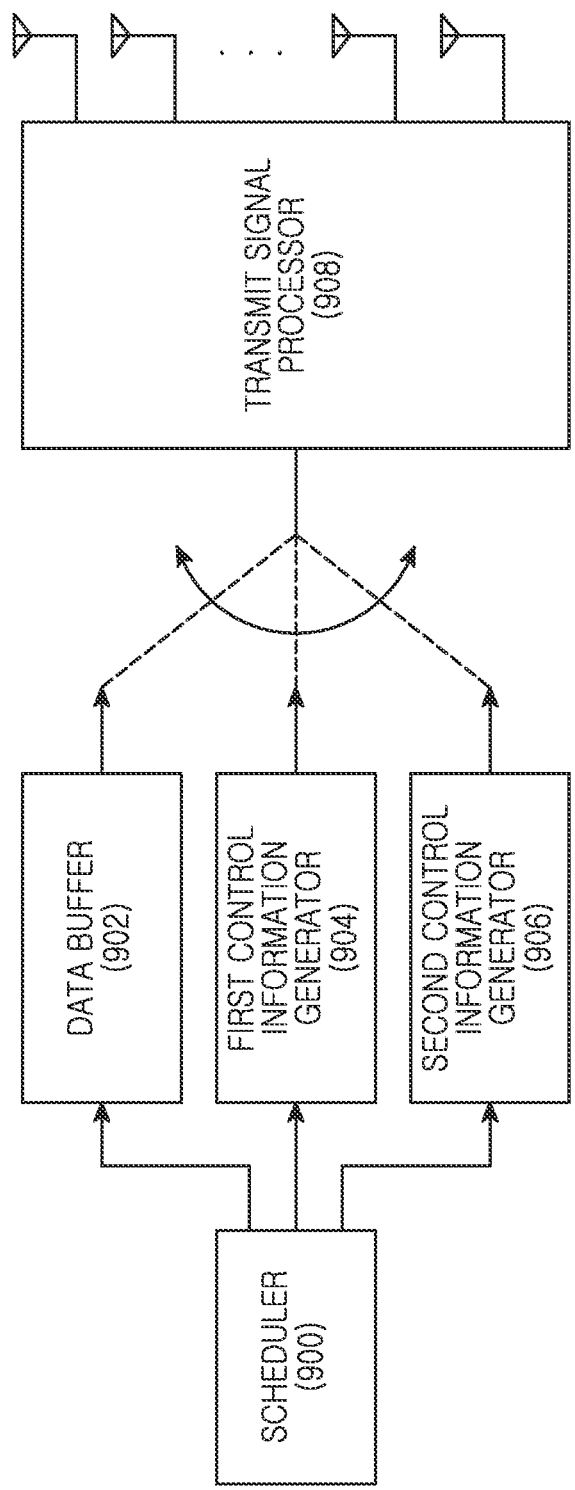
FIG. 9 is a block diagram of a base station in a MIMO system according to an exemplary embodiment of the present invention.

FIG. 9 is a block diagram of a base station in a MIMO system according to an exemplary embodiment of the present invention.

Referring to FIG. 9, the base station includes a scheduler 900, a data buffer 902, a first control information generator 904, a second control information generator 906, and a transmit signal processor 908.

The scheduler 900 schedules the data to transmit over the PDSCH of the subframe and provides the scheduling result to the data buffer 902, the first control information generator 904, and the second control information generator 906.

The data buffer 902 stores the data to transmit to the terminals, and outputs the data of the terminals scheduled in the current subframe to the transmit signal processor 908 over the PDSCH transmission region of the subframe based on the scheduling.

The first control information generator 904 determines based on the scheduling whether the current transmission mode is the MU-MIMO mode. When the current transmission mode is the MU-MIMO mode, the first control information generator 904 generates the first control information including the control information for every transmission mode (e.g., the SU-MIMO mode) excluding the MU-MIMO mode, based on the scheduling, appends the CRC to the generated first control information, adds the information indicating the presence of the second control information to the first control information including the CRC, and encodes and outputs the first control information including the information indicative of the presence of the second control information. When the current transmission mode is a transmission mode other than the MU-MIMO mode, the first control information generator 904 generates the first control information including the control information for transmission modes (e.g., the SU-MIMO mode) other than the MU-MIMO mode, based on the scheduling, appends the CRC to the generated first control information, adds the information indicating the absence of the second control information to the first control information including the CRC, and encodes and outputs the first control information including the information indicative of the absence of the second control information. In this exemplary embodiment, the information indicating the presence of the second control information may be added to the first control information by inserting the 1-bit indicator with the indicator bit '1' or by masking the predefined mask code in the CRC of the first control information. The information indicating the absence of the second control information may be added to the first control information by inserting the 1-bit indicator with the indicator bit '0' or by not masking the predefined mask code in the CRC of the first control information.

The second control information generator 906 examines whether the current transmission mode is the MU-MIMO mode, based on the scheduling. When the current transmission mode is the MU-MIMO mode, the second control information generator 906 generates the second control information including the control information for the MU-MIMO mode, based on the scheduling, appends the CRC to the generated second control information, and encodes and outputs the second control information including the CRC. In contrast, when the current transmission mode is a transmission mode other than the MU-MIMO mode, the second control information generator 906 does not generate the second control information.

The transmit signal processor 908 converts information bit sequences provided from the data buffer 902, the first control information generator 904, and the second control generator 906 into signals of the corresponding communication scheme and transmits the signals to the terminal via antennas. For instance, when the communication conforms to Orthogonal Frequency Division Multiplexing (OFDM), the transmit signal processor 908 converts the information bit sequence into OFDM symbols through encoding, modulating, and Fast Fourier Transform (FFT), and transmits the OFDM symbols over the antennas. The transmit signal processor 908 transmits the information bit sequence fed from the first control information generator 904 to the terminal over the PDCCH transmission region of the subframe, transmits the information bit sequence fed from the second control information generator 906 to the terminal over the predefined transmission region of the PDSCH, and transmits the information bit sequence fed from the data buffer 902 to the terminal over the other transmission region of the PDSCH.

Figure 10:
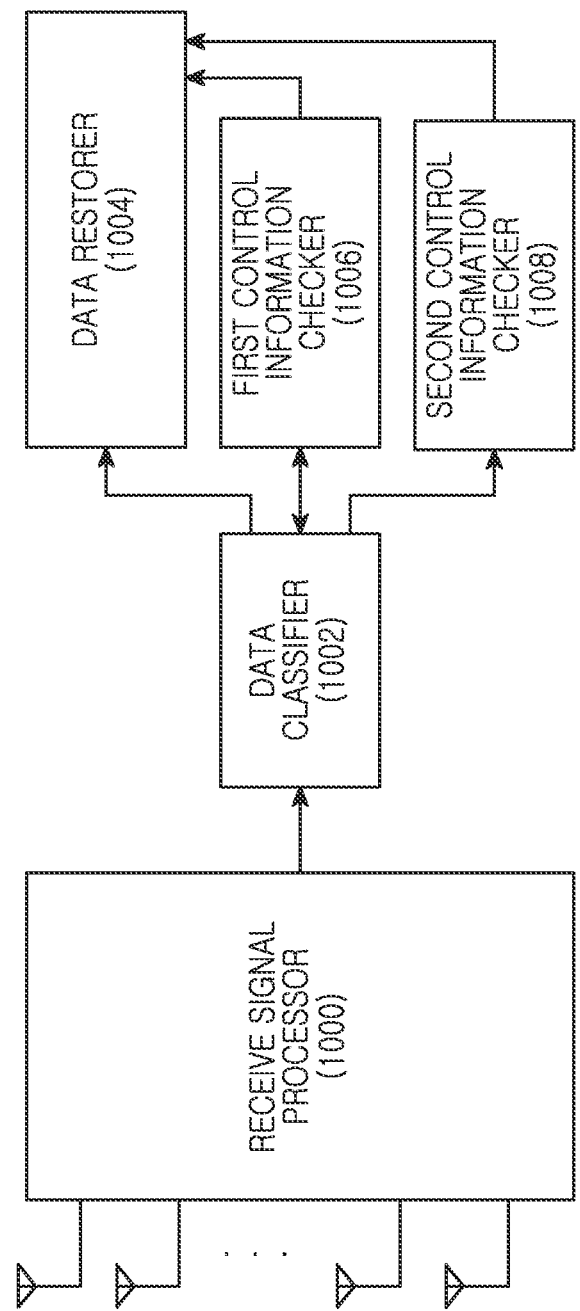
FIG. 10 is a block diagram of a terminal in a MIMO system according to an exemplary embodiment of the present invention.

FIG. 10 is a block diagram of a terminal in a MIMO system according to an exemplary embodiment of the present invention.

Referring to FIG. 10, the terminal includes a receive signal processor 1000, a data classifier 1002, a data restorer 1004, a first control information checker 1006, and a second control information checker 1008.

The receive signal processor 1000 converts the signal received from the base station via antennas into the information bit sequence according to the corresponding communication scheme. For example, when the communication complies with OFDM, the receive signal processor 1000 converts the signal received via the antennas into the information bit sequence through Inverse FFT (IFFT), demodulating, and decoding.

The data classifier 1002 classifies the information bit sequence fed from the receive signal processor 1000 to traffic data, the first control information, and the second control information. More specifically, the data classifier 1002 outputs the information bit sequence provided over the PDCCH transmission region of the subframe of the information bit sequences fed from the receive signal processor 1000, to the first control information checker 1006. Hence, when the first control information checker 1006 requests to receive the second control information, the data classifier 1002 outputs the information bit sequence provided over the predefined transmission region of the PDSCH, to the second control information checker 1008, and outputs the information bit sequence provided over the other transmission region of the PDSCH to the data restorer 1004. When the first control information checker 1006 does not request to receive the second control information, or requests not to receive the second control information, the data classifier 1002 outputs every information bit sequence provided over the PDSCH transmission region to the data restorer 1004.

Based on the first control information fed from the first control information checker 1006 and, if necessary, the second control information fed from the second control information checker 1008, the data restorer 1004 restores the original data by demodulating the data output from the data classifier 1002. More specifically, when the first control information checker 1006 requests to use the first control information and the second control information together in the data recovery, the data restorer 1004 demodulates the data output from the data classifier 1002 based on the first control information and the second control information fed from the first control information checker 1006 and the second control information checker 1008 by considering the MU-MIMO mode. When the first control information checker 1006 requests to use only the first control information in the data recovery, the data restorer 1004 demodulates the data output from the data classifier 1002 based on only the first control information fed from the first control information checker 1006 by considering the corresponding transmission mode. When the first control information checker 1006 requests to use the first control information and the second control information together in the data recovery but the second control information checker 1008 does not provide the second control information, the data restorer 1004 demodulates the data output from the data classifier 1002 based on only the first control information fed from the first control information checker 1006 by considering the MU-MIMO mode.

The first control information checker 1006 receives from the data classifier 1002 and decodes the first control information including the control information for every transmission mode (e.g., the SU-MIMO mode) excluding the MU-MIMO mode, and CRC-checks the decoded first control information. When determining the successful CRC check on the first control information, the first control information checker 1006 provides the decoded first control information to the data restorer 1004 and extracts the information indicating the presence of the second control information from the first control information. When the detected information indicates the presence of the second control information, the first control information checker 1006 requests the data classifier 1002 to receive the second control information and requests the data restorer 1004 to use the first control information and the second control information together in the data recovery. When the detected information indicates the absence of the second control information, the first control information checker 1006 does not request the data classifier 1002 to receive the second control information or requests the data classifier 1002 not to receive the second control information, and requests the data restorer 1004 to use only the first control information in the data recovery. In one exemplary embodiment, the first control information checker 1006 extracts the 1-bit indicator indicating the presence or the absence of the second control information, from the first control information. When the extracted 1-bit indicator is '1', the first control information checker 1006 may determine that the extracted 1-bit indicator indicates the presence of the second control information. When the extracted 1-bit indicator is '0', the first control information checker 1006 may determine that the extracted 1-bit indicator indicates the absence of the second control information. In another exemplary embodiment, the first control information checker 1006 CRC-checks the first control information when the mask code indicating the presence of the second control information is not masked. When the CRC check is successful, the first control information checker 1006 may determine the absence of the second control information. The first control information checker 1006 CRC-checks the first control information when the mask code indicating the presence of the second control information is masked. When the CRC check is successful, the first control information checker 1006 may determine the presence of the second control information.

The second control information checker 1008 receives from the data classifier 1002 and decodes the second control information including the control information for the MU-MIMO mode, and CRC-checks the decoded second control information. When the CRC check on the second control information is successful, the second control information checker 1008 provides the decoded second control information to the data restorer 1004. When the CRC check on the second control information is not successful, the second control information checker 1008 does not provide the decoded second control information to the data restorer 1004.

As set forth above, by transmitting and receiving the control information for the MU-MIMO mode over the data channel (e.g., the PDSCH), rather than the control channel (e.g., the PDCCH) of the subframe, in the MIMO system, it is possible to efficiently support the MIMO transmission and reception and to design the terminal. In particular, the MIMO system may support the dynamic switching between the SU-MIMO mode and the MU-MIMO mode and simultaneously minimize the additional control information transmission of the base station or the additional control information decoding of the terminal.

While the invention has been shown and described with reference to certain exemplary embodiments thereof, it will be understood by those skilled in the that various changes in form and details may be made therein without departing from the spirit and scope of the invention as defined by the appended claims and their equivalents.

What is claimed is:

1. A method of a base station for transmitting control information to a terminal in a Multiple Input Multiple Output (MIMO) system, the method comprising:
   transmitting first control information for every transmission mode except for a Multiple-User (MU)-MIMO mode, to the terminal over a control channel of a subframe; and
   transmitting second control information for the MU-MIMO mode to the terminal over a data channel of the subframe.

2. The method of claim 1, wherein the control channel comprises a Physical Downlink Control CHannel (PDCCH), and the data channel comprises a Physical Downlink Shared CHannel (PDSCH).

3. The method of claim 1, further comprising:
   inserting a 1-bit indicator indicating one of presence and absence of the second control information, into the first control information.

4. The method of claim 1, further comprising:
   masking a mask code indicating presence of the second control information, in a Cyclic Redundancy Check (CRC) of the first control information.

5. The method of claim 1, wherein the second control information is transmitted to the terminal over a predefined region of the data channel, and data is transmitted to the terminal over a region other than the predefined region.

6. The method of claim 1, further comprising:
   scheduling the data channel;
   based on the scheduling, determining whether a current transmission mode comprises the MU-MIMO mode; and
   when the current transmission mode does not comprise the MU-MIMO mode, not transmitting the second control information for the MU-MIMO mode to the terminal.

7. A method of a terminal for receiving control information from a base station in a Multiple Input Multiple Output (MIMO) system, the method comprising:
   receiving first control information for every transmission mode except for a Multiple-User (MU)-MIMO mode, from the base station over a control channel of a subframe; and
   receiving second control information for the MU-MIMO mode from the base station over a data channel of the subframe.

8. The method of claim 7, wherein the control channel comprises a Physical Downlink Control CHannel (PDCCH), and the data channel comprises a Physical Downlink Shared CHannel (PDSCH).

9. The method of claim 7, further comprising:
extracting a 1-bit indicator indicating one of presence and absence of the second control information, from the first control information,
wherein the second control information is received when the extracted 1-bit indicator indicates the presence of the second control information.

10. The method of claim 7, further comprising:
when a mask code indicating presence of the second control information is masked, Cyclic Redundancy Check (CRC)-checking the first control information,
wherein the second control information is received when the CRC check is successful.

11. The method of claim 10, further comprising:
when the mask code indicating the presence of the second control information is not masked, CRC-checking the first control information; and
when the CRC check is successful when the mask code indicating the presence is not masked, demodulating data received from the base station over the data channel, based on the first control information by considering a corresponding transmission mode,
wherein the second control information is not received when the CRC check is successful when the mask code is not masked.

12. The method of claim 7, further comprising:
receiving data from the base station over a region other than a predefined region of the data channel;
CRC-checking the second control information;
when the CRC check is successful, demodulating the received data based on the first control information and the second control information by considering the MU-MIMO mode; and
when the CRC check is not successful, demodulating the received data based on the first control information by considering the MU-MIMO mode,
wherein the second control information is transmitted to the terminal over the predefined region of the data channel.

13. An apparatus of a base station for transmitting control information to a terminal in a Multiple Input Multiple Output (MIMO) system, the apparatus comprising:
a first control information generator for generating first control information for every transmission mode except for a Multiple-User (MU)-MIMO mode;
a second control information generator for generating second control information for the MU-MIMO mode; and
a transmit signal processor for transmitting the generated first control information to the terminal over a control channel of a subframe, and for transmitting the generated second control information to the terminal over a data channel of the subframe.

14. The apparatus of claim 13, wherein the control channel comprises a Physical Downlink Control CHannel (PDCCH), and the data channel comprises a Physical Downlink Shared CHannel (PDSCH).

15. The apparatus of claim 13, wherein the first control information generator inserts a 1-bit indicator indicating one of presence and absence of the second control information, into the first control information.

16. The apparatus of claim 13, wherein the first control information generator masks a mask code indicating presence of the second control information, in Cyclic Redundancy Check (CRC) of the first control information.

17. The apparatus of claim 13, wherein the transmit signal processor transmits the second control information to the terminal over a predefined region of the data channel, and transmits data to the terminal over a region other than the predefined region.

18. The apparatus of claim 13, further comprising:
a scheduler for scheduling the data channel,
wherein the second control information generator determines whether a current transmission mode comprises the MU-MIMO mode, based on the scheduling, and when the current transmission mode does not comprise the MU-MIMO mode, does not generate the second control information for the MU-MIMO mode.

19. An apparatus of a terminal for receiving control information from a base station in a Multiple Input Multiple Output (MIMO) system, the apparatus comprising:
a receive signal processor for receiving first control information for every transmission mode except for a Multiple-User (MU)-MIMO mode, from the base station over a control channel of a subframe, and for receiving second control information for the MU-MIMO mode from the base station over a data channel of the subframe;
a first control information checker for checking the first control information for every transmission mode except for the MU-MIMO mode; and
a second control information checker for checking the second control information for the MU-MIMO mode.

20. The apparatus of claim 19, wherein the control channel comprises a Physical Downlink Control CHannel (PDCCH), and the data channel comprises a Physical Downlink Shared CHannel (PDSCH).

21. The apparatus of claim 19, wherein the first control information checker extracts a 1-bit indicator indicating one of presence and absence of the second control information, from the first control information, and
the receive signal processor receives the second control information when the extracted 1-bit indicator indicates the presence of the second control information.

22. The apparatus of claim 19, wherein, when a mask code indicating presence of the second control information is masked, the first control information checker Cyclic Redundancy Check (CRC)-checks the first control information, and
the receive signal processor receives the second control information when the CRC check is successful.

23. The apparatus of claim 22, wherein, when the mask code indicating the presence of the second control information is not masked, the first control information checker CRC-checks the first control information, and when the CRC check is successful when the mask code is not masked, controls a data restorer to demodulate data received from the base station over the data channel, based on the first control information by considering a corresponding transmission mode, and
the receive signal processor does not receive the second control information when the CRC check is successful when the mask code is not masked.

24. The apparatus of claim 19, wherein the receive signal processor receives the second control information over the predefined region of the data channel and receives data from the base station over a region other than a predefined region of the data channel, and
the second control information checker CRC-checks the second control information, when the CRC check is successful, controls the data restorer to demodulate the received data based on the first control information and the second control information by considering the MU-MIMO mode, and when the CRC check is not successful, controls the data restorer to demodulate the received data based on the first control information by considering the MU-MIMO mode.

* * * * *